(12) United States Patent
Esibov et al.

(10) Patent No.: US 11,768,699 B2
(45) Date of Patent: Sep. 26, 2023

(54) ENFORCE CHANGES IN SESSION BEHAVIOR BASED ON UPDATED MACHINE LEARNING MODEL WITH DETECTED RISK BEHAVIOR DURING SESSION

(71) Applicant: MICROSOFT TECHNOLOGY LICENSING, LLC, Redmond, WA (US)

(72) Inventors: Alexander Esibov, Seattle, WA (US); Itamar Azulay, Mishmar Ayyalon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 16/593,985

(22) Filed: Oct. 5, 2019

(65) Prior Publication Data

US 2021/0103461 A1 Apr. 8, 2021

(51) Int. Cl.
*G06F 9/46* (2006.01)
*G06N 20/00* (2019.01)
*G06F 9/50* (2006.01)
*G06F 21/32* (2013.01)
*G06F 21/56* (2013.01)

(52) U.S. Cl.
CPC ............ *G06F 9/468* (2013.01); *G06F 9/5011* (2013.01); *G06F 21/32* (2013.01); *G06F 21/564* (2013.01); *G06N 20/00* (2019.01); *G06F 2209/5013* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 6,609,198 B1* | 8/2003 | Wood | G06F 21/41 713/155 |
| 2011/0289564 A1* | 11/2011 | Archer | G06F 21/40 726/5 |
| 2016/0065554 A1 | 3/2016 | Brown et al. | |
| 2016/0119379 A1* | 4/2016 | Nadkarni | G06F 21/6245 726/1 |
| 2016/0337365 A1* | 11/2016 | Beiter | G06F 9/468 |
| 2017/0118223 A1 | 4/2017 | Mathew et al. | |

(Continued)

OTHER PUBLICATIONS

"Demo—MFA for Cloud Activities", Retrieved from: https://resources.netskope.com/product-demos/demo-mfa-for-cloud-activities, Mar. 20, 2019, 3 Pages.

(Continued)

*Primary Examiner* — Meng Ai T An
*Assistant Examiner* — Zujia Xu
(74) *Attorney, Agent, or Firm* — WORKMAN NYDEGGER (57) ABSTRACT

Systems and methods are provided for managing dynamic controls over access to computer resources and, even more particularly, for evaluating and re-evaluating dynamic conditions and changes associated with user sessions. The systems and methods are configured to automatically make a determination as to whether new or additional authentication credentials are required for a user that is already authorized for accessing resources in a user session, in response to triggering events such as the identification of a new or changed condition associated with the user session.

17 Claims, 4 Drawing Sheets

(56) References Cited

U.S. PATENT DOCUMENTS

| | | |
|---|---|---|
| 2018/0007059 A1 | 1/2018 | Innes et al. |
| 2019/0220863 A1* | 7/2019 | Novick .................. G06Q 20/10 |
| 2021/0035116 A1* | 2/2021 | Berrington ............ G06F 21/577 |
| 2021/0092112 A1* | 3/2021 | Li ....................... H04L 63/0861 |

OTHER PUBLICATIONS

"International Search Report and Written Opinion Issued in PCT Application No. PCT/US2020/050029", dated Nov. 26, 2020, 12 Pages.

* cited by examiner

ENFORCE CHANGES IN SESSION BEHAVIOR BASED ON UPDATED MACHINE LEARNING MODEL WITH DETECTED RISK BEHAVIOR DURING SESSION

BACKGROUND

Background and Relevant Art

Computers and computing systems have affected nearly every aspect of modern living. For instance, computers are now prevalent in almost all industries, including work, recreation, healthcare, transportation, entertainment, household management, and so forth.

There are many different types of computer resources that can be accessed and controlled by computers to provide functionality. Functions that can be performed by computing systems include, for example, data processing, data storage, system and robotic controls, analytics, imaging, communication, as well as many other types and varieties of functions.

Computer resources that can be accessed and used to perform computer functionality include data, which can be stored in various formats and in disparate types of storage devices, as well as the hardware components and software applications and interfaces that are used to access and processes the data.

Regarding the foregoing, it will be appreciated that computing system functionality can be further enhanced, in some instances, by interconnecting different types of computing systems with different capabilities to facilitate distributed and remote functionality through various computing services via network connections. Network connections may include, but are not limited to, connections via wired and/or wireless Ethernet, cellular connections, or even computer to computer connections through any combination of serial, parallel, USB, and/or other connections. These connections allow, for example, a user to utilize a single computing system to access data, services and other computing resources from one or more connected computing systems to perform a desired set of computer functions as though they were all performed by the same single computing system.

The interconnection of computing systems has facilitated the creation of distributed computing systems, such as so-called "cloud" computing systems. In this description, "cloud computing" includes networked systems and system resources for enabling ubiquitous, convenient, on-demand access to a shared pool of configurable computing resources that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent and are commonly used by tenants, such as large enterprises and other clients that support a plurality of different users, to provide scalability and versatility in the quantity and types of computer resources that can be accessed and utilized to performed desired functionality.

Currently, users are able to initiate different types of actions to access and utilize computer resources (e.g., data, services, and computing hardware components). These actions and the corresponding applications that are used inherently carry different risks and importance. Additionally, the different entities that access the computing resources, including both the tenant users and their applications, may perform their actions with different objectives, some benign, others malicious. Accordingly, there is an ongoing need and desire to provide controls for restricting access to computer resources, both in terms of which entities are permitted access, as well as for controlling the way the computer resources are accessed, to promote safe, desired and beneficial use of the computer resources.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed towards embodiments for managing controls over access to computer resources. In some instances, these embodiments include identifying and enforcing changes in session behavior based on signals and/or other conditions that are monitored or identified during a user session.

In some instances, disclosed embodiments include or can be utilized to provide systems and processes for monitoring dynamic conditions associated with user sessions and for dynamically applying and/or reapplying user authentication requirements based on the dynamic conditions during the user sessions, which may include obtaining redundant and/or new authentication information for authenticating users during user sessions for which they were already authenticated for and based on the dynamic conditions.

Some embodiments include methods and systems that implement the methods for monitoring dynamic conditions associated with user sessions and for dynamically applying and/or reapplying user authentication requirements based on the dynamic conditions during the user sessions. These embodiments include a computing system evaluating a user request to access a set of one or more computing resources, as well as for determining a set of user credentials that are required for selectively granting the user request based on a set of dynamic conditions, based on one or more policies. The system also obtains and evaluates the user credentials prior to granting or denying the request and corresponding privileges for accessing the set of resources based on their credentials, according to the current policies.

Then, after granting or denying the user request, the system monitors and/or otherwise identifies a change in the set of dynamic conditions. Based on this change in the set of dynamic conditions, the system determines whether new user credentials are required to continue authorizing/granting the user request and corresponding privileges for the user to access the computer resources. If no new credentials are required, the system may maintain the session uninterrupted and/or may otherwise continue providing the granted access/privileges. Alternatively, if it is determined new credentials are required, the system may interrupt or terminate the session or the granted access/privileges for that user/session, and/or may otherwise require that the new credentials be provided for the user to continue providing the granted access/privileges. The system will also determine which new credentials are required, based on the new set or changed set of dynamic conditions. The new credentials may comprise redundant authentication credentials already provided when the initial access was granted and/or different authentication credentials than those that were already provided when the initial access was granted.

This Summary is provided to introduce a selection of concepts in a simplified form that are further described below in the Detailed Description. This Summary is not intended to identify all features, key features or essential features of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed towards embodiments for managing dynamic controls over access to computer resources and, even more particularly, for evaluating/re-evaluating dynamic conditions associated with user sessions for selectively determining whether to require or to refrain from requiring additional authentication credentials for the users engaged in user sessions for which they have already been authenticated and in order to continue granting (or alternatively to restrict/limit/terminate) access to computer resources in the user sessions based on the new/changed dynamic conditions.

In this application, a user session is generally defined as any computing session that is associated with a particular user/entity (e.g., individual person or application entity) that is identifiable and identified to the computing system that is providing/controlling access to the computer resources through the user session and which may include/require login credentials and/or require a user logging into the session to access one or more computer resources. In some instances, the session is a temporary and interactive information interchange between two or more communicating devices (e.g., a user computing device and a remote computing device). The session is established after the user logs into the session with appropriate credentials and is provided a token, certificate or other information from the server/managing system, which is used during the session to grant access to one or more computer resources. An established communication session may involve more than one message in each direction.

In some instances, the session is stateful, meaning that at least one of the communicating systems needs to hold current state information (including, but not limited to data/object states/logs and/or credential information and/or authentication information) and save information about the session history in order to be able to communicate, as opposed to stateless communication, where the communication consists of independent requests with responses.

In some instances, a user session is a session between a user of a tenant organization in which privileges/permissions granted during the session to the user are based at least in part on policies of the tenant with regard to access and/or use of computer resources associated with the tenant and which may be available on a server system (e.g., tenant server) and/or that may be available on one or more distributed systems through one or more connected systems/services.

As mentioned throughout, disclosed embodiments include systems and methods for monitoring/identifying dynamic conditions and changes to those conditions and for enforcing the access privileges/permissions associated with those dynamic conditions, as they change (in real-time and/or periodically), based on tenant policies. These embodiments include making a determination as to whether new user authentication information is required for a user that has already been authorized for certain session privileges, in order to continue granting/authorizing those same session privileges, or alternatively whether no new user authentication information is required, based on an analysis of the dynamic conditions relative to the tenant policies.

In some instances, the disclosed embodiments include or can be utilized to achieve technical benefits over existing control systems that are only configured to statically enforce predefined access/condition policies. For instance, in some embodiments, the disclosed systems and methods can be used to dynamically reevaluate and apply policies based on newly considered and/or dynamically modified conditions that are identified during a user session. In this manner, disclosed embodiments can continuously and dynamically re-evaluate policies, conditions and the corresponding user authentication(s) required to grant and/or deny access to requested computer resources during user sessions to mitigate and address potential changes in the risk conditions/profiles of the user sessions.

It will be appreciated that this is an improvement over systems that than rely on predefined static conditional access policies, including static permissions based on data type (which may require additional credentials for particular data requests) and session timeout policies that may require a user to reauthenticate after a predetermined period of time (such as a period of inactivity).

Figure 1:
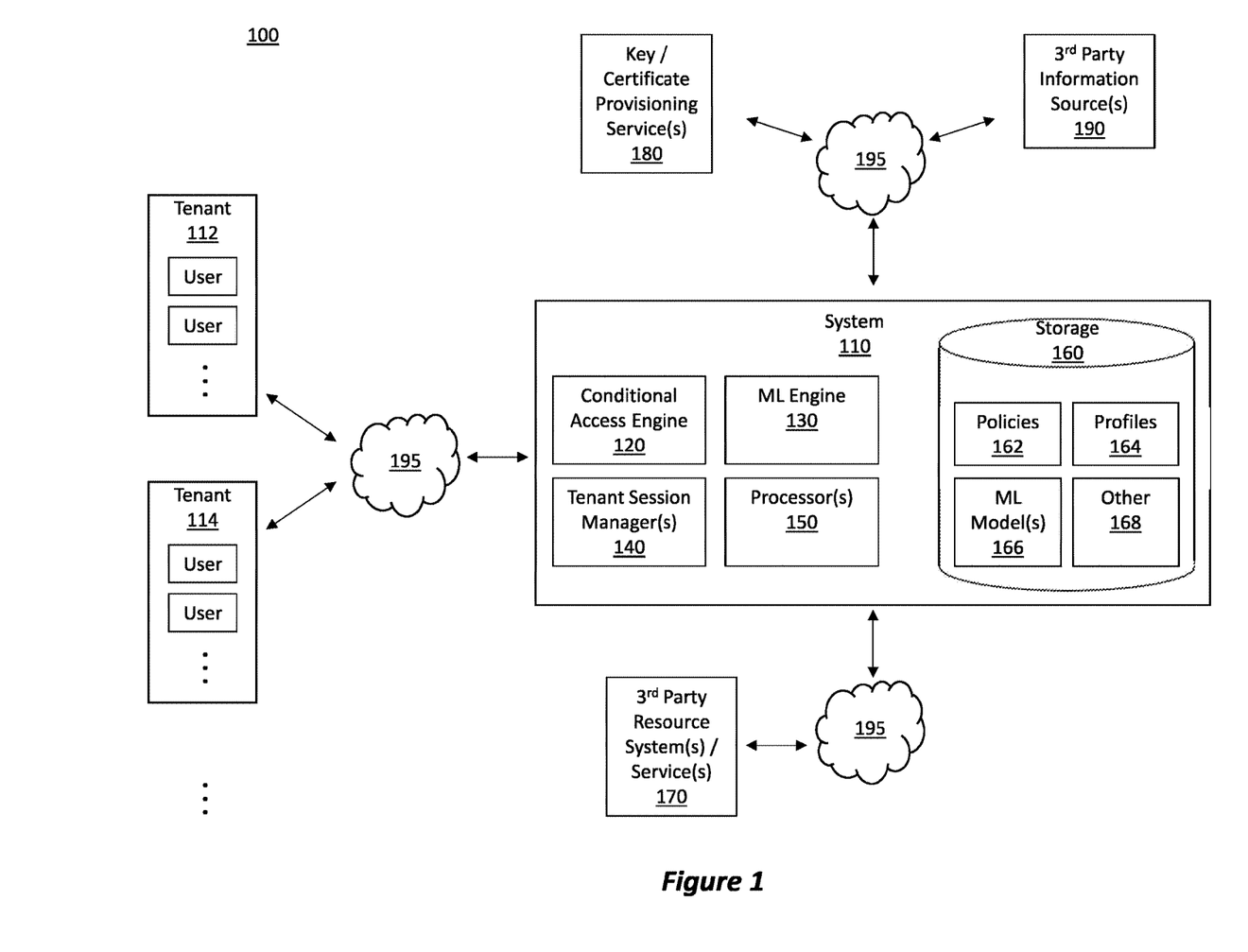
FIG. 1 illustrates a computing environment with a system that provides dynamic controls over access and privileges granted to users for computer resources accessed during user sessions.

Attention is now directed to FIG. 1, which illustrates a computing environment 100, including system 110, which is configured to manage user sessions for users at one or more tenants (e.g., tenant 112, 114) in which the users request access to computer resources available at the system and/or that may be accessible at 3rd party resource system(s)/services(s) 170 through the system 110.

As shown, the system 110 includes one or more processor(s) 150, which may be hardware processors, and which execute stored computer-executable instructions stored in storage 160 (or remote 3rd party system(s) 170), to implement the disclosed functionality. In some instances, the execution of the computer-executable instructions instantiates the disclosed components of the system 1170, such as the conditional access engine 120, the ML engine 130 and the tenant session manager(s) 140, and/or which causes the disclosed components to perform the functionality disclosed herein.

In some instances, the system 110 is also connected with one or more 3rd party information source(s) 190, which are configured to provide condition information associated with a user, tenant, computer resource, network condition, location or calendar or time information, event data, device behavior, sensor data and/or any other data or condition information which may affect the system 110, user, tenant, or computer devices being used in the session and/or the computer resource(s) being accessed during a user session.

The system 110 may also be connected with one or more service, such as key/certification provisioning service(s) 180 configured to generate credential (e.g., a token, key, certificate, certification or other credential) that can be associated with a user/tenant and that may be required as a prerequisite for accessing certain computer resources that may be requested during a user session. In some instances, the key/certification provisioning service(s) 180 generates and provides the credential, such as a user or tenant credential for accessing certain computer resources associated with the user/tenant, respectively, in response to a user providing certain authentication information, such as a user name or password and/or tenant identifier information. This credential may be obtained prior to initiating a user session, while initiating the user session (e.g., during a logging in process), and/or during an existing session.

In some instances, different credentials are provided for different users and/or tenants and which are mapped to different computer resources and which are used to enforce different global and/or tenant and or user specific access right policies. These policies 162 may be stored in storage 160 and/or on remotes systems and/or on the tenant/user devices. The corresponding user and tenant profiles 164 may also be stored in any of the disclosed systems with or separate from ML (machine learning) models that identify different risk profiles/scores for different users, tenants, session conditions and/or computer resources.

The ML model(s) 166 may be generated, updated and/or accessed in real-time, such as before and/or during a user session, to determine a potential risk associated with granting a user rights/privileges for accessing computer resources that are requested by the user and/or that are otherwise associated with user permissions according to the stored policies 162 and/or profiles 164 and/or other 168 information that is stored by the system 110 and that may be obtained from 3rd party information source(s) 190, for example.

The system 110 communicates with the different remote systems (e.g., tenants 112, 114, key/certificate provisioning service(s) 180, and 3rd party systems 170, 190, through one or more network connections 195.

Additionally, while the system 110 is shown as a single system in FIG. 1, it will be appreciated that system 110 may also comprise a distributed computing system with different components of the overall system 110 duplicated on the different distributed systems and/or contained separately on different dedicated/distributed systems of the overall system 110.

During use, a user of a tenant logs into the system to access one or more computer resources (e.g., tenant associated resources) that are available at the system 110 and/or that are otherwise accessible through the system 110, such as at remote and connected systems/services. When appropriate credentials are provided during the login process, based on existing conditions, the system establishes a session with the user for accessing the approved computer resources associated with that user/tenant profile and corresponding policies.

For instance, the conditional access engine 120 may evaluate all existing conditions at the time of the login request/process to determine whether to establish the session between the user (e.g., user device) and the system 110 or remotely connected system/service. This login request is one type of request to access the computer resources available at or through the system.

The conditions that the conditional access engine 120 considers in making the determination of whether to establish the session (which may also be a decision to grant access to computer resources) and/or to grant access to computer resources (even after login) can include one or more of the stored policies 162, profiles 164, ML model(s) 166, information from the 3rd party information source(s) 190 and/or from the key/certificate provisioning service(s) 180. The conditions may also include information detected about the user system/devices and information obtained from the user, including credentials and other information (e.g., 212, 214, 216 shown in FIGS. 2 and 3) that may be provided before, during or after login.

The conditions that are evaluated may also include other information 168 such as a frequency of user request, duration of existing and/or prior user sessions, requested resource type, type of request, availability/scarcity of requested resource(s), location of user or resource(s), resource access cost(s), importance or value associated with resource(s), priority associated with request and/or requested resource(s), security level associated with resource(s) or request, current network utilization, monitored user behaviors and user device profiles detected by the system or 3rd party systems, magnitudes of resource(s) being requested, other user behaviors, and/or any other information associated with the system 110, with the resources available to the system 110, with the user, and/or with other users/tenants).

In some instances, the conditional access engine 120 will grant initial access to computer resources, such as by granting the request for the user session and establishing the requested user session. The conditional access engine 120 may also grant access to specifically requested computer resources that are requested during an already established/authorized user session.

When a session is granted, the tenant session manager(s) 140 will track the permissions and other state associated with the user session to grant/deny access to resources within the session that are requested by the user based on associated policies and based on the profiles of the users/tenants and/or ML model(s) 166. The tenant session manager(s) 140 may also terminate or suspend a previously authorized session until a user provides new credentials that may be required by the tenant session manager(s) 140. The tenant session manager(s) 140 is notified which new credential(s) may be required by the conditional access engine 120 when the conditional access engine 120 becomes aware of new conditions and/or changes to the conditions that were considered for authorizing/establishing the user session and/or for granting other requested computer resources.

The tenant session manager(s) 140 and/or the conditional access engine 120 may also continuously monitor the conditions and condition information described earlier, which may be dynamically changed during a session (at least subsequent to the initial granting of authorization/privileges for the user session and/or for specific computer resource(s) requested by the user during the user session). For instance, by way of non-limiting example, the frequency and/or quantity of user requests, the network conditions, the availability of resources, the risk profiles of resources or requests, user/tenant profiles, user behaviors, device and application behaviors/states, time, durations of use, information from 3rd party systems (e.g., updates to malware definitions), costs and/or any of the other conditions and condition information associated with the system 110, user/tenant, user device and/or resource may change during a session.

In response to the detected change in the particular set of dynamic conditions, a new determination of whether to request additional credentials from the user is made by the conditional access engine 120. It will be appreciated that this determination is not a simple and predetermined static decision, such as a predefined policy to request a new login after a predetermined period of inactivity or a static decision to request additional credentials of a certain type whenever a particular type of resource is requested.

Instead, this additional determination of whether to request additional credentials includes a dynamic analysis of an updated set of conditions associated with the user and that may have already been considered by the conditional access engine 120. For instance, the conditional access engine may consider/re-evaluate new condition information, such as a change in state of a previously considered set of conditions, such as changes in user behaviors, network conditions or other conditions. This may also include, for example, considering new profiles and updated ML models which can be continuously updated by ML engine 130 based on detected risk behaviors, definitions, profiles and/or other new or updated condition information.

The consideration of the new set of conditions may comprise analyzing previous conditions (with the same or different state) inclusive of and/or exclusive of a corresponding analysis of one or more entirely new conditions that were not previously considered when making the previous decision(s) for granting the session and/or access to specifically requested computing resources.

In some instances, the tenant session manager(s) 140 will terminate or pause a session during or after the process of determining whether new credentials should be provided. In other instances, the session continues (in a paused state) until the user provides the new credential information and only temporarily denies/suspends the requested access for a resource until the user provides the requested new credential information.

A determination of whether to obtain different/additional credentials may result in the system causing the user to initiate a new session which may require the same or different credentials than were previously required for an earlier session, based on the constraints/requirements of the current policies, profiles and ML model(s) that exist at the time of the new login.

The new credential information may be the same credential information provided for previously establishing the session (or for obtaining access to a particular requested resource), only requested at a different time. Alternatively, or additionally, the new credential information may include entirely different credential information, such as a new password or identifier, or a multi-factor authentication from a different device or application than was used by the user to provide the initial credential information. The new credential information can be character input, biometric input, gesture input, administer or other user input, proximity sensor input, or any other input.

In some instances, the requested new credential information is explicitly requested by the user through a user interface that is generated by and/or provided by the system 110/tenant session manager(s) 140 in response to making the determination that new credential information is needed, along with a description of what is needed. This may include a notice of a session being terminated and/or being suspended until the user provides the new credential information.

In other instances, the new credential information is transparently requested by the user in a request to the user device/application and which results in the user device/application automatically providing the additional credential information.

In some instances, the request for new credential information is sent to a separate entity than the user, such as to an administrator, with or without notice of the request to the user.

Figure 2:
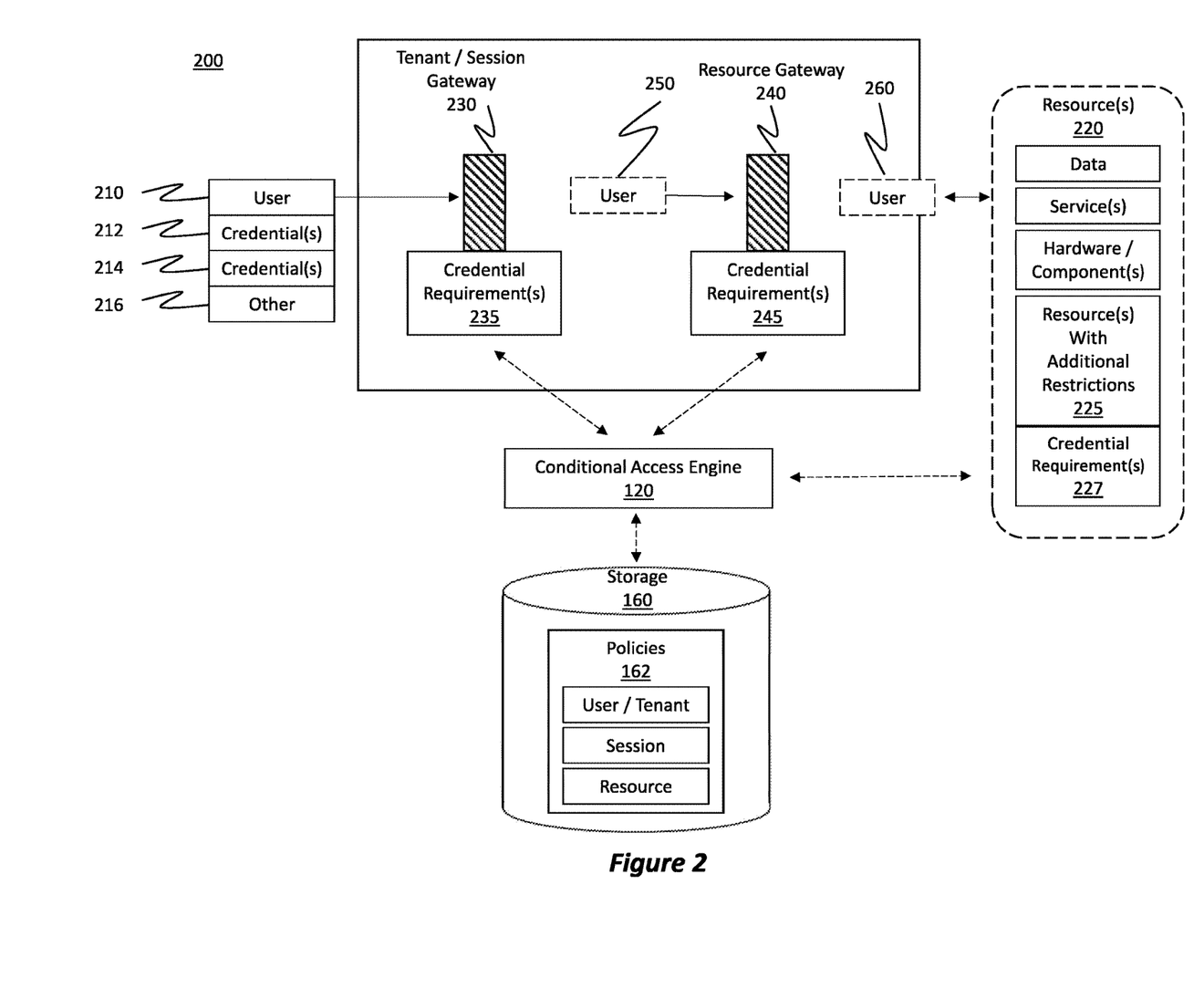
FIG. 2 illustrates a visualization of gateways and a conditional access engine associated with controls over user access to computer resources through corresponding user sessions.
Figure 3:
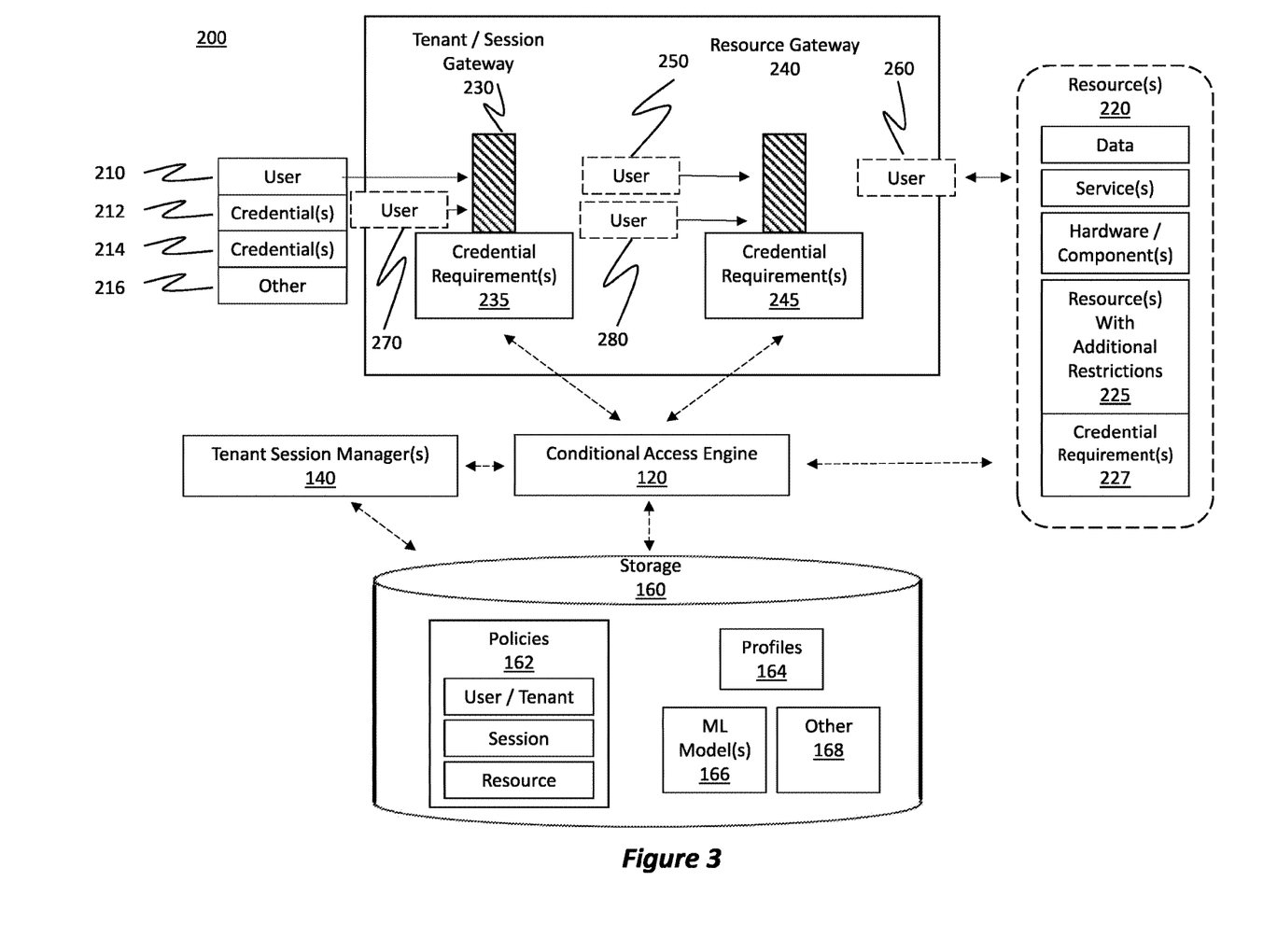
FIG. 3 illustrates another visualization of gateways, tenant session manager(s) and a conditional access engine associated with controls over user access to computer resources through corresponding user sessions.

Attention will now be directed to FIGS. 2 and 3.

As shown, a user 210 is associated with one or more credentials 212, 214 as well as other information 216, such as information that defines a user/tenant profile or identity. The user 210 of a tenant, for example, is able to obtain access to one or more resource(s) 220 associated with the tenant/user by establishing a session with a hosting/proxy service that provides access to the resource(s) by satisfying the authentication requirements of the gateways that control or restrict access to the resource(s). These gateways may be based on tenant/system policies and may be associated with credential requirements, for example, that must be provided by a user before the tenant/user session is established and/or other specific resources 220 are made accessible to the user.

In the current embodiment, a user must provide a first set of credentials (e.g., credential(s) 212, which may include a name and password or any other credential(s)) to establish a tenant session with the system. When this occurs, for example, the user is moved through the first gateway 230 to position 250, where the user is able to access tenant resources (e.g., resource(s) 220) made available at the system.

In some instances, however, the user must also provide additional credentials (e.g., credential(s) 214 or other information, such as a particular token or key) to access the resource(s) 220, or at least a specific set of computer resources with additional restrictions 225 (with additional credential requirements 27), subsequent to establishing the user session and to provide unfettered access to the specific set of computer resources, such as illustrated by the user moving through gateway 240 to position 260.

The conditional access engine 120 considers a set of conditions, including different policies (such as user/tenant, session and resource policies) in making the determination as to whether to grant a user request for specific computer resources, including the initial session request. These policies may be static or dynamic policies. The conditional access engine 120 may also consider other conditions, as described throughout, in making such determinations.

Additionally, as also described, the system may provide one or more tenant session manager(s) 140, such as one for each tenant or for each type of tenant, that is configured to track user session states and corresponding conditions associated with the sessions, users/tenants, and requested resources. The tenant session manager(s) 140 are also configured to interrupt and pause/suspend or terminate a session upon detecting a triggering event for causing the conditional access engine 120 to determine whether additional/new authentication information is needed to maintain or authorize a continued session and/or access to requested resource(s).

This is shown in FIG. 3, for example, when a user was previously granted access to a session (e.g., at position 250) and to specifically requested resources (e.g., at position 260), but in which new conditions detected by the system triggered the event for causing the conditional access engine 120 to determine whether additional/new authentication information is needed to maintain or authorize the continued session and/or access to requested resource(s). In this example, the user is figuratively put back into position 270 or 280, such that they must provide the new credential requirement(s) 235 and/or 245 to maintain the existing session, or to start a new session, and/or to obtain continued access to the requested resource(s) 220.

In the present example, the system is requiring only the same identical credential requirements to be provided, which were previously provided by the user for the initial granted request(s) for the user session/resource(s), even though the determination is made that new credential requirements are needed.

In other examples, not visually represented, the credential requirement(s) 235 and/or 245 are replaced by and/or augmented with different credential requirement(s) that must be provided by the user to maintain a granted session or access to resources, as described earlier, and that have not previously been provided by the user when previously establishing the session and initial granted request(s) for resources.

As further illustrated, the system may consider/evaluate other information included in the dynamic conditions when determining whether additional/new credential information is required to maintain or continue providing access to requested resources, which resources may comprise a user session and/or data, services, or other system components that are requested during the session.

It is also noted that the triggering event for initiating the automatic consideration/determination of whether additional credential information is needed is based on a detected change in a dynamic condition associated with the session, the user/tenant, or other system component or 3rd party system, as previously discussed. In this regard, the system is able to be more flexible and dynamic in responding to changes that occur in a system/session after a session is established and/or access privileges are granted for resources.

By way of example, consider a situation in which a user (person or application) provides credentials for establishing a session with a system for obtaining resources. Then, at some point during the session, the user's behavior changes dramatically, initiating significant quantities of requests for the same or different processes and/or for significant magnitudes of scarce resources. Each of these requests may be authorized according to current policies and conditions and corresponding set of initial credentials that were provided by the user, and which were determined to be required according to the current policies and conditions that existed at the time the user logged into the system and established the session. However, the user's behavior comprises a change in a dynamic condition associated with the user's profile (which may be associated with an impulsive malicious activity, such as a Snowden type event) and/or a change in an updated ML risk model that increases a risk profile for a particular user. These types of conditions/changes, for example, can trigger a new consideration of whether new credentials are required to authorize/grant requested computer resources.

The triggering event may also result from new conditions being discovered or considered, such as the discovery of other compromised systems and/or updated malware definitions (which may be associated with a propagating virus), for example, or a change in detected location or proximity of a user (which may be associated with a hijacked or stolen device), or any other new condition and/or dynamically changed condition.

If a determination is made that additional credentials are required, the system may require the user to provide the same initial credentials and/or different credentials to justify/satisfy the policy requirements associated with the session or resource access in view of the new set of detected conditions.

It will be appreciated that by imposing the or new requirements for the user to provide new/supplemental credentials in view of the detected conditions/changes during an established session, it is possible to prevent some undesired/unauthorized access to resources that are undesired (in view of a totality of considered conditions and user/tenant profiles, policies and risk models) and that are not specifically identified as being prohibited activities in a static policy of an existing system and that would not otherwise be prevented by the application of the static policies of existing systems.

Figure 4:
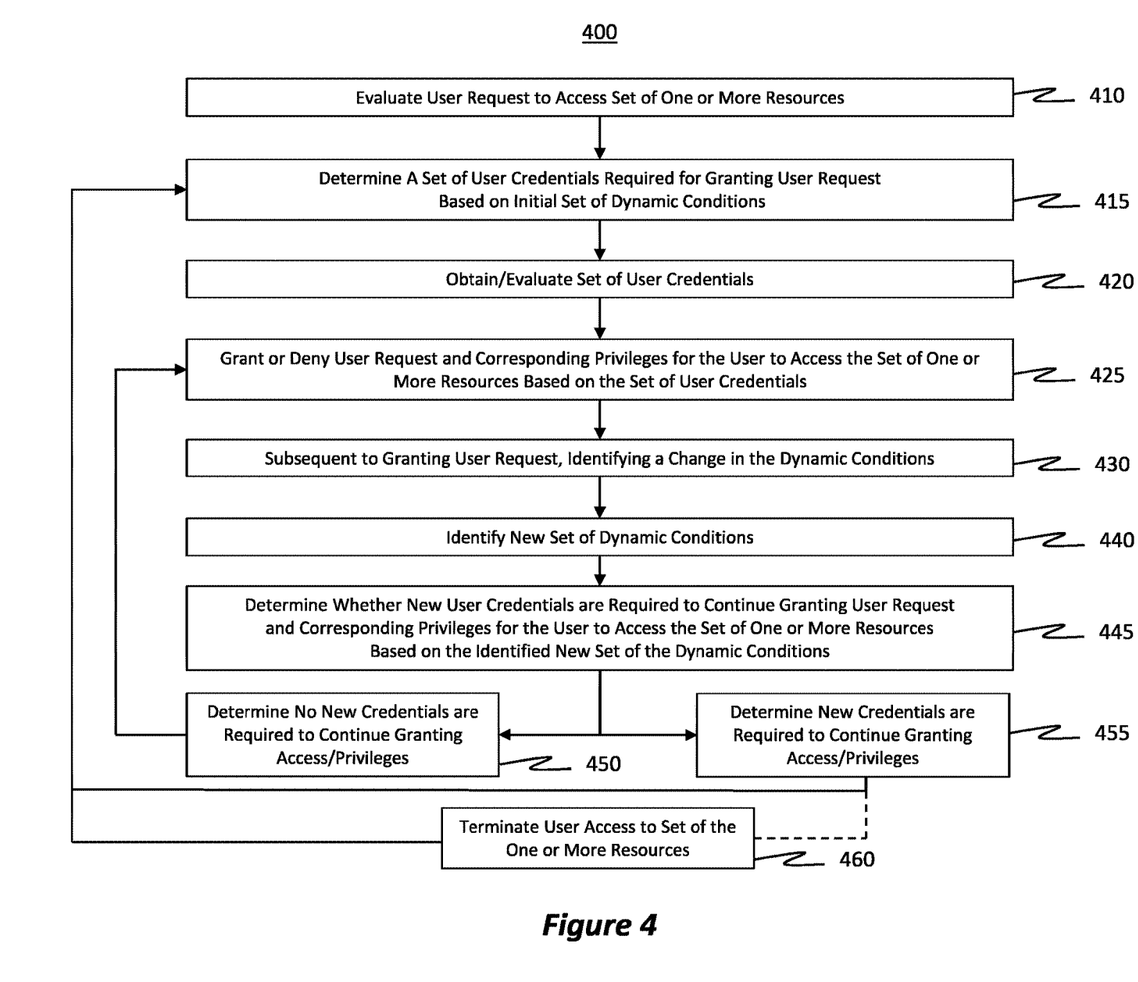
FIG. 4 illustrates a flow diagram with a plurality of acts associated with the methods and functionality of the disclosed embodiments and which may be implemented by the system of claim 1, for example.

Attention is now directed to FIG. 4, which illustrates a flow diagram 400 of acts associated with the functionality and methods of the disclosed embodiments.

As shown, a system first receives and evaluates a user request to access computer resource(s) (act 410). This request may be a request to establish a user session with a system, for example, or to access a specific computer resource after establishing a user session with the system.

Next, the system determines a set of credentials that are required by the user to grant the request and based on a current evaluation of existing conditions (act 415), which may include evaluating user/tenant profiles, policies, ML models, and other conditions.

Then, the system obtains the credentials (act 420), either automatically by pulling data from the user's device(s) transparently to the user and/or by explicitly requesting the credentials from the user, such as with a login exchange/interface.

Next, the system grants/denies the request(s) (act 425) based on the credentials that are obtained. In some instances, this includes granting a request to establish a session and/or to provide requested resources to a user through the system/session.

Thereafter, the system detects a triggering event, such as a change in a condition that was previously evaluated and/or a new condition, as part of a new set of dynamic conditions (act 440).

This triggering event cause the system to determine whether new user credentials are required to continue granting the user request and corresponding privileges for the user to access the granted set of requested resources based on an evaluation of the new/changed conditions detected to cause the identification of the triggering event and/or a different set of dynamic conditions (act 445). The determination may include or exclude the consideration of other conditions that existed at the time of the initial granting of the user request(s), in a previous state and/or in a changed state of the condition.

In some instances, the consideration of whether new user credentials are required to continue granting the user request and corresponding privileges for the user to access the granted set of requested resources will result in different outcomes for a same user based on different variations in dynamic conditions considered during the determination. These dynamic conditions may include, for example, information other than a duration of inactivity and/or a request for a particular type of resource. In some instances, the dynamic conditions include changes in network utilization by the user, changes in behavior of the user relative to recorded user profile behavior, changes in availability and/or scarcity of resources, frequency or magnitudes of resources requested, velocity of change in user profiles/behaviors, information from 3rd party systems and so forth.

If it is determined that no new credentials are required, the system continues granting the access/privileges to the resources/sessions that were previously provided. This may include unsuspending a session (while maintaining session state) and/or unlocking a resource that is temporarily locked during the determination act 445.

During the determination act 445, and or upon determining that the new credentials are required, the system may suspend or terminate a session (deleting session state for the terminated session) and/or lock/delete and/or prevent access to a resource that the user was previously granted access to (act 460) while requesting and/or until the newly requested credentials are received.

Thereafter, if new credentials are provided (act 420), which are determined to be appropriate for a requested access based on current considerations of the user/tenant profiles and existing policies and/or other conditions, then the resources can be granted (act 425). This may include establishing a new session with new session state or unsuspending an existing session (in which prior session state is maintained). This may also include creating a new copy of a requested resource and or unlocking access to a resource.

The new credentials provided to satisfy the new request for credentials may include the same credentials provided by the user to the system for establishing the prior/current session and/or one or more different credentials that were not previously provided by the user to the system for establishing the prior/current session. In some instances, the new credentials include multi-factor authentication credentials (e.g., a different or same credential) being provided to the system on different user devices that the system associates with the user. They may additionally or alternatively include at least one credential provided by a separate entity (e.g., an administrator who is prompted for the credential in response to a request from the system or the user).

It will be appreciated that other variations and combinations of the foregoing are also contemplated within the scope of the invention and that the methods of the invention may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system that dynamically controls access to computer resources and that determines when new credential information is warranted for granting access, said system comprising:
   a storage;
   a conditional access engine;
   one or more tenant session managers;
   a machine learning engine;
   one or more processors; and
   one or more physical computer-readable storage media that store instructions that are executable by the one or more processors to cause the system to:
      cause the conditional access engine to access one or more policies associated with one or more computer resources of a particular tenant, the one or more policies configured to enforce access permissions of the one or more computer resources based on one or more user credentials and one or more triggering events, the one or more triggering events comprising a triggering event based on evaluating a first condition associated with a comparison between behavior of a user in a current user session and behavior of the user in prior user sessions, wherein a third party information source connected to the system provides information related to the behavior of the user in the prior sessions, and wherein the one or more policies are stored in the storage;
      cause the conditional access engine to receive user credentials from the user for requesting access to a particular computer resource of the one or more computer resources of the particular tenant;
      in response to verifying the received user credentials based on the one or more policies, cause the conditional access engine to establish a user session and provide the user access to the particular computer resource;
      cause one of the conditional access engine or the one or more tenant session managers to monitor events associated with the particular computer resource occurring during the user session;
      in response to detecting at least one triggering event among the one or more triggering events associated with a change in a second condition relating to a machine learning model associated with the user session, cause the conditional access engine to reevaluate the user session based on the one or more policies, wherein the machine learning model is updated by the machine learning engine, wherein the machine learning engine updates the machine learning model based on a detected risk behavior, and wherein, when the machine learning model is updated based on the detected risk behavior, a risk profile for the user session increases;
      based on the reevaluation, cause the conditional access engine to dynamically determine whether new user credentials are required to provide the user continued access to the particular computer resource; and
      upon determining that the new user credentials are not required, cause the conditional access engine to continue to provide access to the particular computer resource, or alternatively,
      upon determining that the new user credentials are required:
         cause the one or more tenant session managers to suspend the granted access to the particular computer resource while maintaining session state for the user session;
         cause the conditional access engine to request the new user credentials from the user; and
         upon obtaining the new user credentials, cause the one or more tenant session managers to unsuspend the granted access to the particular computer resource.

2. The system of claim 1, wherein the system further terminates the user session during the determination of whether the new user credentials are required.

3. The system of claim 1, wherein the change in conditions comprises a detected change in user behavior relative to a stored user profile.

4. The system of claim 1, wherein the change in conditions comprises a change in user location.

5. The system of claim 1, wherein the change in conditions comprises a change other than a detected period of inactivity or a new request for a particular resource or type of resource.

6. The system of claim 1, wherein the system further requests the new user credentials from the user and receives the new user credentials from the user.

7. The system of claim 6, wherein the new user credentials include at least one credential that was not previously provided by the user to the system for establishing the user session.

8. The system of claim 7, wherein the new user credentials include multi-factor authentication credentials provided through at least two different devices.

9. The system of claim 8, wherein the new user credentials include at least one credential provided by an entity other than the user.

10. A method for dynamically controlling access to one or more computer resources accessible to a computing system and for dynamically determining when new credential information is needed for granting access to the one or more computer resources in a previously established and authorized user session between a user and the computing system, which includes a storage, a conditional access engine, one or more tenant session managers, and a machine learning engine, the method comprising:

causing the conditional access engine to access one or more policies associated with the one or more computer resources of a particular tenant, the one or more policies configured to enforce access permissions of the one or more computer resources based on one or more user credentials and one or more triggering events, the one or more triggering events comprising a triggering event based on evaluating a first condition associated with a comparison between behavior of a user in a current user session and behavior of the user in prior user sessions, wherein a third party information source connected to the computer system provides information related to the behavior of the user in the prior sessions, and wherein the one or more policies are stored in the storage;

causing the conditional access engine to receive user credentials from the user for requesting access to a particular computer resource of one or more computer resources of the particular tenant;

in response to verifying the received user credentials based on the one or more policies, causing the conditional access engine to establish a user session and to provide the user access to the particular computer resource;

causing one of the conditional access engine or the one or more tenant session managers to monitor events associated with the particular computer resource occurring during the user session;

in response to detecting at least one triggering event among the one or more triggering events associated with a change to a second dynamic condition relating to a machine learning model associated with the user session, causing the conditional access engine to reevaluate the user session based on the one or more policies, wherein the machine learning model is updated by the machine learning engine, wherein the machine learning engine updates the machine learning model based on a detected risk behavior, and wherein, when the machine learning model is updated based on the detected risk behavior, a risk profile for the user session increases;

based on the reevaluation, causing the conditional access engine to dynamically determine whether new user credentials are required to authorize and to continue granting the user access to the particular computer resource; and upon determining that new user credentials are not required, causing the conditional access engine to continue to provide access to the computer resources, or alternatively, upon determining that the new user credentials are required:
  cause the one or more tenant session managers to terminate or suspend the granted access to the particular computer resource, while maintaining session state for the user session;
  cause the conditional access engine to request the new user credentials from the user; and
  upon obtaining the new user credentials, cause the one or more tenant session managers to unsuspend the granted access to the particular computer resource.

11. The method of claim 10, wherein the method further includes terminating the user session during the determination of whether the new user credentials are required.

12. The method of claim 10, wherein the change in the dynamic condition comprises a detected change in a user behavior relative to a stored profile for the user.

13. The method of claim 10, wherein the change in the dynamic condition comprises a change in a frequency or magnitude of the requested computer resources.

14. The method of claim 10, wherein the change in the dynamic condition comprises an updated malware definition.

15. The method of claim 10, wherein the method includes receiving the new user credentials from the user and wherein the new user credentials include at least one credential that was not previously received by the user prior to the determination of whether the new user credentials are required.

16. The method of claim 15, wherein the new user credentials include at least a biometric authentication credential.

17. A physical computer-readable storage media having stored thereon computer-executable instructions that are executable by one or more processors of a system to dynamically control access to one or more computer resources accessible to the system and to dynamically determine when new credential information is needed for granting access to the computer resources, the system comprising a storage, a conditional access engine, one or more tenant session managers, and a machine learning engine, the system being configured to:
  cause the conditional access engine to access one or more policies associated with the one or more computer resources of a particular tenant, the one or more policies configured to enforce access permissions of the one or more computer resources based on one or more user credentials and one or more triggering events, the one or more triggering events comprising a triggering event based on evaluating a first condition associated with a comparison between behavior of a user in a current user session and behavior of the user in prior user sessions, wherein a third party information source connected to the system provides information related to the behavior of the user in the prior sessions, and wherein the one or more policies are stored in the storage;
  cause the conditional access engine to receive user credentials from the user for requesting access to a particular computer resource of one or more computer resources of the particular tenant;
  in response to verifying the received user credentials based on the one or more policies, cause the conditional access engine to establish a user session and provide the user access to the particular computer resource;
  cause one of the conditional access engine or the one or more tenant session managers to monitor events associated with the particular computer resource occurring during the user session;
  in response to detecting at least one triggering event among the one or more triggering events associated with a change in a second condition relating to a machine learning model that is associated with the user session, cause the conditional access engine to reevaluate the user session based on the one or more policies, wherein the machine learning model is updated by the machine learning engine, wherein the machine learning engine updates the machine learning model based on a detected risk behavior, and wherein, when the machine learning model is updated based on the detected risk behavior, a risk profile for the user session increases;
  based on the reevaluation, cause the conditional access engine to dynamically determine whether new user credentials are required to authorize and to continue granting access to the particular computer resource;

upon determining that new user credentials are not required, cause the conditional access engine to continue to provide access to the particular computer resource, or alternatively, upon determining that the new user credentials are required:
- cause the one or more tenant session managers to suspend the granted access to the particular computer resource, while maintaining session state for the user session;
- cause the conditional access engine to request the new user credentials from the user; and
- upon obtaining the new user credentials, cause the one or more tenant session managers to unsuspend the granted access to the particular computer resource.

\* \* \* \* \*